Dec. 18, 1951 — W. H. SMITH — 2,578,753
PARACHUTE LOAD CUSHIONING MECHANISM
Filed Dec. 12, 1949
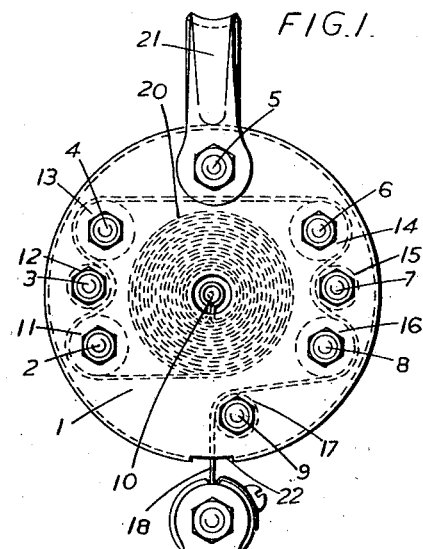
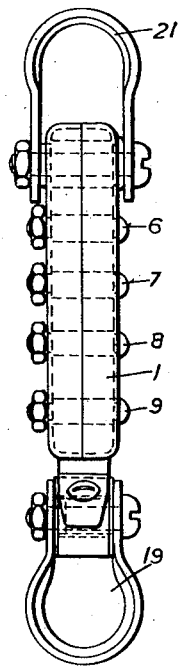
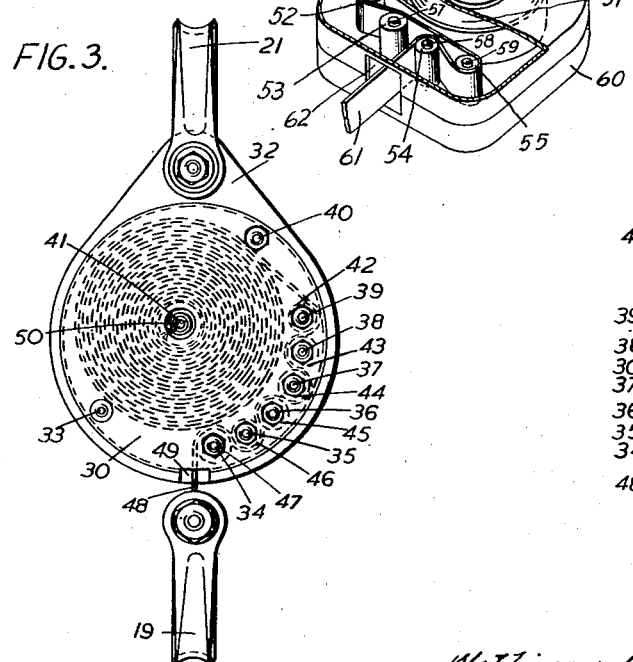
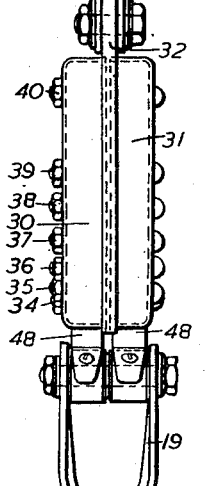
INVENTOR
William H. Smith
BY
ATTORNEY Patented Dec. 18, 1951

2,578,753

UNITED STATES PATENT OFFICE 2,578,753

PARACHUTE LOAD CUSHIONING MECHANISM

William Herbert Smith, Ease Molesey, England

Application December 12, 1949, Serial No. 132,623
In Great Britain August 18, 1944

9 Claims. (Cl. 188—65.4)

This invention relates to parachute mechanism and more particularly to a device for materially reducing the impulse force between the article and the parachute when the latter opens. This is a continuation-in-part of application Serial No. 616,136, filed September 13, 1945, now abandoned.

It is well known that the opening of a parachute produces a sudden jolt due to the impulse force produced by the weight of the article carried by the parachute. In existing mechanisms the impulse force is something like seven times the weight of the article. This causes a heavy shock on the article and is unpleasant and possibly injurious to a human being as well as inanimate articles, particularly mechanical mechanisms. This sudden jolt or impulse force is commonly called the "snatch."

Having in mind the defects of the prior art mechanisms, it is an object of the present invention to provide means for substantially reducing the impulse force between a parachute upon opening and an article carried thereby. Specifically it is an object to substantially eliminate the "snatch" and reduce the impulse force from about seven times the weight of the article to about one and one-half times the weight.

It is another object of the invention to employ the strain energy of a ductile material to absorb the impulse or snatch force.

It is a further object of the invention to provide a device for attaching a load or article to a parachute that will absorb the snatch force when the parachute opens.

It is a still further object of the invention to provide a device having a simplicity of design and organization, economy of construction and efficiency in operation.

The foregoing objects and others ancillary thereto are preferably accomplished by a ductile strip, preferably mild steel, and means for paying out the strip and simultaneously exceeding the yield point thereof to absorb the impulse force by strain energy. Specifically, for a parachute mechanism, the invention comprises a frame or casing having a hanger or shackle for connection to a parachute, and a coiled strip having one end secured to the frame and the other adapted for connection to the load, with bending elements or rollers carried by the frame and around which the strip passes. As the strip is uncoiled and payed out by impulse on the load, the bends around the elements exceed the yield point and thus absorb the impulse by strain energy.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing, wherein like reference characters indicate like parts throughout the several figures and in which:

Fig. 1 is a side view in elevation of one form of shock absorber according to the invention;

Fig. 2 is an edge view in elevation of the device shown in Fig. 1;

Figs. 3 and 4 are similar views of a modified construction; and

Fig. 5 is a view in perspective of another modified construction, intended for lighter loads.

It is well known that when a strip of ductile material is bent to a sufficiently small radius, the stress in the material exceeds a value known as the "yield point." In mild steel, this is about 15 tons per square inch. The material becomes permanently stretched and does not return to its original length when the load is released. In this stretching process, energy is absorbed and the energy is called "strain energy" and this phenomenon is employed in accordance with the present invention to absorb the impulse or snatch force which arises when a parachute opens.

The present invention may comprise various modifications to meet the various demands depending on the load weight, parachute size and materials employed. Although various ductile materials may be employed, mild steel strip is preferred and will hereinafter be referred to in describing the invention. The device is hereinafter referred to as a "snatch eliminator."

Referring now to the drawings to illustrate the physical form of the invention, specifically to Figs. 1 and 2, a supporting frame may comprise a circular casing 1 made in two halves which, preferably, are connected by bolts 2, 3, 4, 5, 6, 7, 8, 9, and houses a coil of mild steel strip 20 and a plurality of bending elements or rollers 11, 12, 13, 14, 15, 16, 17 which may comprise or be journalled on said bolts. A hanger 21 is carried by the casing and provides for connection to a parachute. The steel strip is anchored at one end to a central pin 19, and its other end portion passes from the coil over the rollers 11, 12, 13, 14, 15, 16, 17, which cause reversely directed bends in the strip, and the end 18 thereof passes out through an opening 22 in the casing 1.

A shackle 19 is secured to the strip end 18 for connection to the article to be dropped by the parachute.

Figs. 3 and 4 show an apparatus of greater energy absorptive power than that of Figs. 1 and 2, and may comprise two energy-absorbing strips of ductile material arranged in parallel. This device comprises two circular cup-shaped casing members 30, 31 which are clamped to a central plate 32 by bolts 33, 34, 35, 36, 37, 38, 39, 40. Each coil of strip is anchored at its inner end 41 to a pin 50 and passes from the outside of the coil over rollers 42, 43, 44, 45, 46, 47 which provide bends in successive reversals of direction. The ends 48 of the strips pass out through openings 49 in the bottoms of the casing members 30, 31 and are anchored to the shackle 19, to which may be connected the article to be dropped by the parachute.

Fig. 5 shows another form of the snatch eliminator which is particularly suitable for smaller loads, and for indirect attachment, as between a kitbag or the like and a person dropped from aircraft by parachute. This modification has a two-part casing 60, 70 which houses a spool 51 of ductile strip material and has rollers 52, 53, 54, 55 mounted on spindles 56, 57, 58, 59 housed in the casing. The strip 61 passes through an opening 62 in the casing after having passed in turn over the rollers 52, 53, 55 and 54 so that it receives four bends successively in opposite directions. The apparatus is connected by a shackle 63 either direct to the parachute or to a person or article connected thereto.

Appropriate sizes for the strips are 25 standard sheet gauge in thickness, ½ in. in width and of length 7 feet upwards according to the load to be carried. These sizes will be varied in relation to the load weight and the size of the parachute.

In addition, the number and angle of the bends, that is, the disposition and diameter of the rollers, are varied in accordance with the load weight, parachute diameter and size of strip.

The number of bends or rollers employed is determined by the pay-out or deployment load required and a balance is obtained in this respect relating to the included angle over each roller in conjunction with the confines of the case.

The thickness of the strip or tape varies according to the static weight of the load to be carried in relation to appropriate deceleration rate permissible. The thickness is also taken into account as regards high or low separating velocities, that is, speed of load relative to the snatch eliminator at the moment pay-out commences.

Parachute diameter has a bearing on the choice of a suitable snatch eliminator for any particular project in so far as the diameter of a parachute determines, within limits, the landing speed of a load. A large parachute would naturally exert more severe gravity acceleration conditions on a given load than a small one and in consequence the length of deployment of the tape or strip would be greater with a large parachute.

For purpose of illustration, let it be supposed that a body of weight 100 lbs. suffers a force corresponding to a retardation of 20g (g being the gravity acceleration) at a certain speed and altitude using a given parachute. It is desired to reduce this force to 2g which means the snatch eliminator must reduce the force to 2×100=200 lbs. When considering the design for any particular application, the time or distance through which this force is effective must be taken into consideration and this controls the length of the metal strip.

To produce the desired force of 200 lbs. in the snatch eliminator and to arrive at an approximation as regards number and diameter of rollers, an empirical formula is applied as follows:

$$Q=\frac{ya2n2\pi\left(\frac{D+2t}{2}-\frac{D+t}{2}\right)}{2\pi\left(\frac{D+t}{2}\right)}$$

This reduces to $$Q=\frac{ftn}{r}$$

Where
Q=deployment reaction (=200 lbs. in this case)
y=yield stress in lbs. per sq. in. of metal strip (=44,800 lbs.)
t=thickness of strip (=0.024 in.)
w=width of strip (=0.5 in.)
a=sectional area=tw (=0.012 sq. inch)
f=ay. (Yield force) (=560 lbs.)
D=roller diameter—say (=⅜ in.)

$$r=\frac{D+t}{2} \quad (=0.2 \text{ in.})$$

$$r_2=\frac{D+2t}{2} \quad (=0.212 \text{ in.})$$

So that n=number of rollers (=3)

In a static drop test wherein the reaction on the tape or strip was approximately 200 lbs., using 54 lbs. weight falling 15.5 feet plus 63 inches tape deployment from the snatch eliminator, the extension of the tape measured .44 inch per foot average. The strip becomes permanently extended in length by approximately 10 percent each time the eliminator is used. Obviously, the strip cannot be used again, so a new one is inserted before re-use.

The foregoing formula is only approximate and in practice the breadth and thickness of the strip or tape is decided by practical tests after the formula has been employed as a guide. In practice, the "snatch" is found experimentally for each size of parachute by mounting a dynamometer between the parachute and the load.

The great advantage of the invention resides in the fact that the yield point of a strip of given steel quality is constant so that a constant resistance can be provided. In addition, the load carrying capacity limits can be found experimentally. The strip may comprise a wire or cable but preferably is in the form of a flat tape as it is easier to handle and its characteristics may be more readily determined in designing the particular device for the particular work involved.

In certain instances some advantage is to be gained by using more than one snatch eliminator in circuit. Relatively high separating velocities demand the use of thin retarder strips as these move away with less reactionary forces due to inertia factors. Also it may be considered necessary to increase the number of units in the circuit to provide facilities for manual control through separate suspension lines in the case of the eliminator principle being desired on a man-carrying parachute with direct coupling thereto.

The snatch eliminator is essentially a device to absorb shock loads and although primarily devised for use with parachutes, its useful purpose is by no means confined to this service. An indirect use, related to airborne loads or stores, is that of stabilizing or maintaining the alignment of equipment relative to an aircraft in order to provide near-ideal conditions when parachute deployment commences. In such cases the snatch eliminator is attached between the aircraft and the equipment and acts as a "pilot" or stabilizer to the store through a given distance or period and then releases at one end so as to leave the store in the desired relative position as the parachute(s) take control. The snatch eliminator has thus acted as an anti-tilting device.

Although certain specific embodiments of the invention have been shown and described, it is obvious that many modifications thereof are possible. The invention, therefore, is not to be restricted except in so far as is necessitated by the prior art and by the spirit of the appended claims.

What I claim is:

1. A device adapted to reduce the impulse force between a support and a load suspended therefrom, which device comprises a casing, fastening means on said casing, a coiled strip of ductile steel mounted in said casing and having one end secured thereto, the other end of said strip extending freely beyond said casing, fastening means on said free end of said strip, and a plurality of elements in said casing adjacent said coiled strip and around which said strip passes to have reverse bends formed therein, one of said elements being on one side of said casing, another element being on the opposite side of said casing and still another element being intermediate said two mentioned elements, said strip passing from its coil around said first mentioned element forming at least one reverse bend of small radius, back past said coil and around said second mentioned element forming at least another reverse bend of small radius, and finally passing around said intermediate element and out through said casing.

2. A device adapted to reduce the impulse force between a support and a load suspended therefrom, which device comprises a casing, fastening means on said casing, a coiled strip of mild steel mounted in said casing and having one end secured thereto, the other end of said strip extending freely beyond said casing, fastening means on said free end of said strip, and a plurality of elements in said casing adjacent said coiled strip and around which said strip forms reverse bends, a plurality of said elements being positioned as a group substantially in a line on one side of said coil, and a plurality of said elements being positioned as a group substantially in a line on the opposite side of said coil and still another element being intermediate said two groups of elements, said strip passing from said coil to and around alternate sides of the elements in said first mentioned group, forming a plurality of reverse bends of small radius, past the opposite side of said coil to and around alternate sides of the elements in the second mentioned group forming a plurality of reverse bends of small radius, and finally around said intermediate element and out through said casing.

3. A device for reducing impulse forces between two members, which comprises a support including means for attachment to one of the members, a strip of ductile steel having one end secured to said support, means on the free end of said strip for attachment to the other of the members, said strip being carried by said support to be payed out upon an impulse between the members, and rollers journalled on said support and around which the free end portion of the strip extends, said rollers being positioned to define bends of sufficiently small radius to strain the ductile steel beyond the yield point without material frictional resistance to absorb the impulse by strain energy.

4. A device for reducing impulse forces between two members, which comprises a casing, means on said casing having an opening for attachment to one of the members, a spindle transverse said casing, a strip of mild ductile steel coiled around said spindle and having its inner end attached to said spindle, means on the outer end of said strip for attachment to the other of the members, a plurality of rollers journalled in said casing, the outer end portion of said strip extending around said rollers and through said opening to be payed out upon an impulse between the members, said rollers being positioned to form bends of sufficiently small radius to strain the ductile steel beyond the yield point and thereby absorb the impulse by strain energy.

5. A device for reducing impulse forces between two members, which comprises a strip of ductile steel, means for attaching the one end of said strip to one member and the other strip end to the other member, and means normally retaining said strip ends in close proximity but permitting paying-out of said strip upon an impulse between the members, said latter means including means around which said strip is trained to form a bend of sufficiently small radius to strain the ductile steel beyond the yield point as the strip is payed out, whereby to absorb the impulse by strain energy.

6. A device for reducing impulse forces between two members, which comprises a support including means for attachment to one of the members, guide means carried by said support and defining a path having a bend, a strip of ductile steel having one end portion threaded through the path of said guide means and around said bend with one strip end extending freely therebeyond, means for attaching said one strip end to the other of the members, said strip being carried by said support to be payed out through said guide means upon an impulse between the members, and means for anchoring the other end of said strip to said support, said bend being of sufficiently small radius to strain the ductile steel beyond the yield point and absorb the impulse by strain energy.

7. A device for reducing impulse forces between two members, which comprises a support including means for attachment to one of the members, a strip of ductile steel having one end connected to said support, means on the other strip end for attachment to the other of said members, said strip being gathered on said support to be payed out from said support upon an impulse force between the members, and bending means on said support and around which said strip is trained to form a bend in said strip as it is payed out, said bend being of sufficiently small radius to strain the ductile steel beyond the yield point thereof and absorb the impulse by strain energy.

8. A device for reducing the impulse forces between two members, which comprises a support including means for attachment to one of the members, a strip of ductile steel having one end secured to said support, means on the free end of said strip for attachment to the other of the members, said strip being carried by said support to be payed out from said support upon an impulse between the members, and bending elements on said support and around which the free end portion of said strip extends, said elements being positioned to form bends in said strip as it is payed out, said bends being of sufficiently small radius to strain the ductile steel beyond the yield point thereof and absorb the impulse by strain energy.

9. A device for reducing impulse forces between two members, which comprises a casing, means on said casing for attaching said casing to one of the members, a strip of mild ductile steel having one end secured to said casing and with the other end extending freely beyond said casing, means on said free strip end for attachment to the other of the members, said strip being coiled in said casing to be payed out upon an impulse between the members, and a plurality of bending elements in said casing and around which the strip passes as it is payed out by an impulse force, said elements being positioned to form bends in said strip as it is payed out, said bends being of sufficiently small radius to strain the ductile steel beyond the yield point and absorb the impulse by strain energy.

WILLIAM HERBERT SMITH.

REFERENCES CITED

The following references are of record in the file of this patent:

UNITED STATES PATENTS

| Number | Name | Date |
| --- | --- | --- |
| 289,730 | Tillett | Dec. 4, 1883 |
| 300,090 | Larson et al. | June 10, 1884 |
| 1,198,926 | Kemp | Sept. 19, 1916 |
| 2,156,294 | Kessenich | May 2, 1939 |
| 2,161,820 | Kessenich | June 13, 1939 |
| 2,474,124 | Schultz | June 21, 1949 |

FOREIGN PATENTS

| Number | Country | Date |
| --- | --- | --- |
| 587,983 | Great Britain | 1947 |